United States Patent [19]

Nelson

[11] 4,026,328
[45] May 31, 1977

[54] LAVATORY SPOUT

[75] Inventor: Merritt J. Nelson, Sparta, Mich.

[73] Assignee: Zin-Plas Corporation, Grand Rapids, Mich.

[22] Filed: July 28, 1975

[21] Appl. No.: 599,604

[52] U.S. Cl. .................................. 137/801; 4/195; 239/590.5

[51] Int. Cl.² ......................................... F16K 21/00

[58] Field of Search ............... 137/801, 382, 382.5; 4/191, 195, 187, 192; 239/590, 590.5

[56] References Cited

UNITED STATES PATENTS

| | | | |
|---|---|---|---|
| 1,796,740 | 3/1931 | Zolleis | 137/801 X |
| 2,790,632 | 4/1957 | Mellette | 137/801 X |
| 3,796,380 | 3/1974 | Johnson | 137/801 |
| 3,871,406 | 3/1975 | Anderson | 137/801 |

FOREIGN PATENTS OR APPLICATIONS 1,395,727  3/1965  France ..................... 4/195

Primary Examiner—Alan Cohan
Attorney, Agent, or Firm—McGarry & Waters

[57] ABSTRACT

A lavatory spout having a one-piece integrally molded plastic body with a depending hollow shank portion and an outwardly extending hollow spout portion. The spout and shank portions are in open communication so that water passes through the shank and spout portions. A bottom cover flange is also formed on the body spout portion and extends outwardly along the length of the spout portion. Desirably, the lower flange forms a ring around the upper portion of the shank. A hollow elbow conduit is secured to the outer open end of the spout portion, providing elbow passage at the outer end thereof. A separate cover extends over the spout, the elbow conduit and the upper portion of the shank with the sidewalls of the cover meeting the sidewalls of the body cover flange. Means are provided for securing the cover to the body and to the elbow conduit. A pop-up rod tube, of brass or molded in one piece of a plastic material, is provided within the body and extends downwardly into the shank portion. Seals are provided between the upper and lower portions of the pop-up rod tube and the interior of the body to provide an annular water passage.

12 Claims, 6 Drawing Figures

LAVATORY SPOUT

BACKGROUND OF THE INVENTION

1. Field of the Invention

The invention relates to lavatory spouts of the type wherein hot and cold water are supplied to a shank from valved faucets, passed through an annular area in the shank and out through a spout.

2. State of the Prior Art

In U.S. Pat. No. 3,590,876 to Young, there is disclosed a lavatory spout construction in which a brass casting is covered with a two-part zinc die cast cover. The brass casting is conventional in the art and has an externally threaded hollow shank to which water is supplied and a spout through which water passes. An aerator is threadably retained in the outer end of the spout. A pop-up rod extends through the shank of the casting and is housed within a pop-up rod tube which forms an annular water passage within the casting.

This casting is very expensive to manufacture because of the high cost of the material and because of the numerous machining operations which must be performed on the part. Skilled labor is required to perform the maching operations.

Unsuccessful attempts have been previously made to replace the brass casting with a less expensive part. One such attempt is disclosed in the U.S. Pat. No. 3,796,380 to Johnson et at. The Johnson et al spout has an integrally molded spout and body portion which forms a water passage as well as the decorative outer surface of the spout. A separate shank must be threaded into the bottom of the spout body. In the forming operation, an opening is made in the back of the body which must be sealed with a separate plug. An ultrasonic welding operation is required for sealing the plug. Further, the plug is aesthetically undesirable.

In another unsuccessful attempt to replace the machined casting, a copper spout pipe was joined to a cast screw machine shank containing a pop-up tube. A two-part zinc die cast plated cover enclosed the spout and the upper portion of the shank.

Plastic spouts and conduits are well known in the plumbing industry. For example, a plastic water spout is disclosed in U.S. Pat. No. 3,871,406 to Anderson. The Anderson spout is a tub spout which is designed to threadably engage a water pipe and includes a plastic cover.

Heretofore, a suitable replacement for the machined casting in the lavatory-type spout construction has not been achieved.

SUMMARY OF THE INVENTION

According to the invention, a lavatory spout has a one-piece integrally molded body having an outwardly extending hollow spout portion with an open outer end and a depending hollow shank portion. The spout and shank portions are in open communication so the water can pass continously through the shank and spout portions. Means in lower portion of a shank are provided to supply water thereto. A bottom cover flange on the spout portion extends outwardly from a bottom portion thereof and along the length thereof. Desirably, the bottom flange includes a ring which extends around an upper portion of the shank.

A hollow elbow conduit is secured to the outer open end of the body spout portion and provides an elbow passage at the outer end of the spout portion. A cover for the body and elbow conduit has a top and depending sidewalls which extend around the spout, the elbow conduit, and the upper portion of the shank with the sidewalls of the cover meeting the sides of the cover flange to enclose the spout portion.

Means are provided for securing the cover to the body and to the elbow conduit.

In one embodiment, a pop-up rod tube is positioned within the body and extends from an upper portion thereof to a lower portion of the shank. The pop-up rod tube has an outer diameter less than the inner diameter of the shank to define an annular water passage therebetween. Means are provided for sealing the pop-up rod tube at upper and lower portions to the body to prevent leakage of water. The pop-up rod tube has an outwardly extending lip at a lower end which abuts the bottom of the body shank portion to precisely position the pop-up rod tube within the body. The pop-up rod tube can be made from a lightweight plastic material and molded in one piece or can be made of brass from screw machine stock. The tube is hollow so that a pop-up rod can extend therethrough and through the body of the spout to operate a sink drain valve.

Desirably, the shank of the body has a threaded outer surface below the ringed flange for securing the body to a support and for securing a water supply conduit thereto.

In one embodiment, the securing means for the cover and the body comprise bosses extending downwardly from within a rear portion of the cover and threaded openings in the bosses with screws extending through the ring flange threadably engaging the threaded openings in the bosses.

The elbow conduit has side flanges extending outwardly thereof to mate with the sidewalls of the cover to enclose portions of the elbow conduit. Desirably, bosses with threaded openings extend downwardly from the cover adjacent the elbow conduit and to the side flanges. Screws extend through the side flanges and threadedly engage the holes in the bosses to secure the elbow conduit to the cover.

BRIEF DESCRIPTION OF THE DRAWINGS

The invention will now be described with reference to the accompanying drawings in which.

DESCRIPTION OF THE PREFERRED EMBODIMENTS

Figure 1:
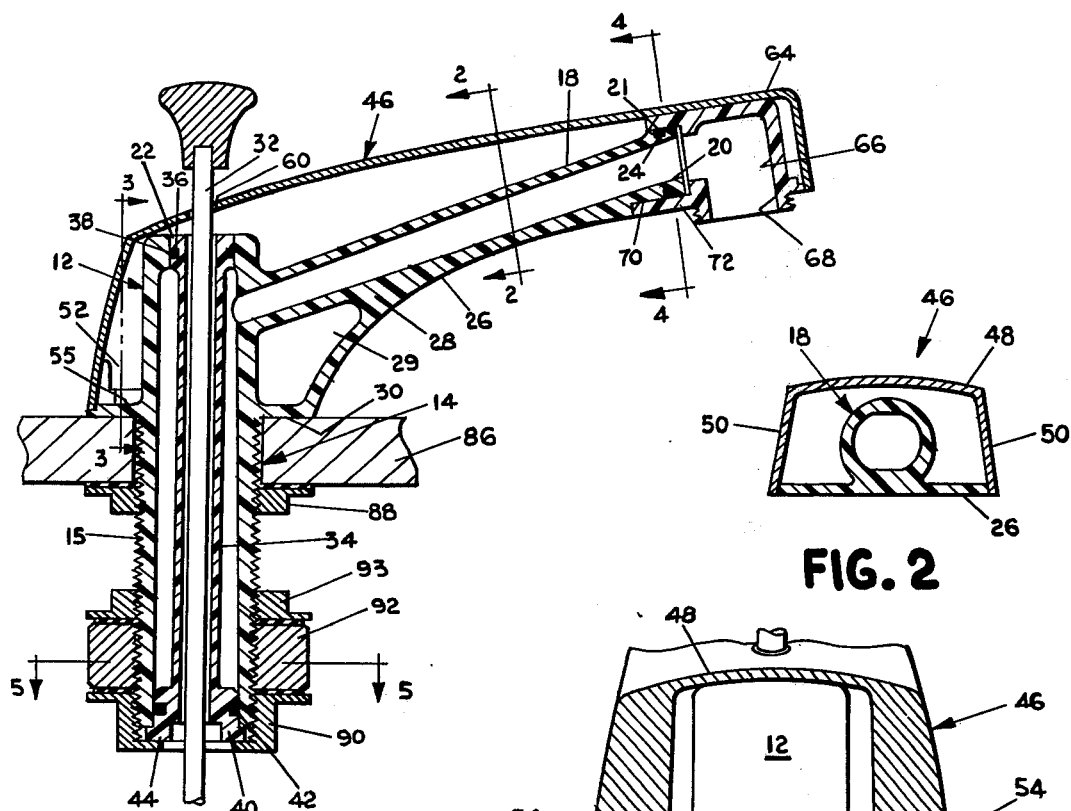
FIG. 1 is an elevational view in section of a lavatory spout according to the invention.
Figure 2:
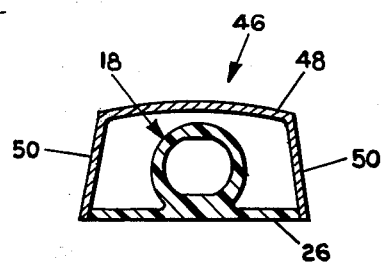
FIG. 2 is a partial sectional view taken along lines 2—2 of FIG. 1.

Referring now to the drawings and to FIGS. 1–5 in particular, there is shown a lavatory spout assembly having a body 12 with a shank portion 14 and a hollow spout portion 18, the body being integrally molded in one piece of a moldable plastic material such as polycaprolactams (Nylon), acetal copolymer resins, acrylics and polyvinyl chloride. A hollow pop-up rod tube 34 is mounted in the body 12 and extends through the shank portion 14. A pop-up rod 32 slides within the tube 34 and operates a sink drain plug (not shown) in conventional fashion. A hollow elbow conduit 64 is secured to an open end 20 of the spout portion 18 and provides an elbow connection for the water passage in the spout portion 18. A decorative cover 46 is mounted over the upper portion of the body 12 including the spout portion 18 and also covers the elbow conduit 64.

Figure 5:
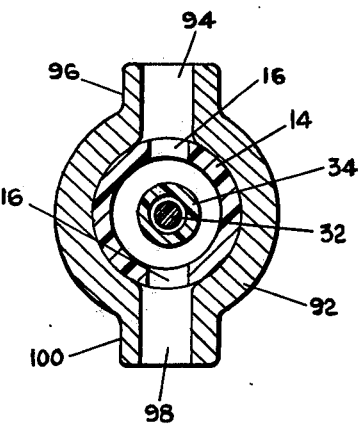
FIG. 5 is a sectional view taken along lines 5—5 of FIG. 1.

The shank portion 14 of the body 12 is hollow with an open bottom end and water passage openings 16 near a bottom portion thereof (FIG. 5). At the upper end of the body a pop-up tube opening 22 is formed. The outer surface 15 of the shank portion 14 is threaded throughout most of its length.

As seen in FIG. 1, the pop-up rod tube 34 extends between the open bottom end of the shank portion 14 and the pop-up tube opening 22 at the upper end of the body 12. The pop-up rod tube 34 has a grooved sealing ring 36 at an upper portion thereof with an O-ring seal 38 positioned in the groove of the sealing ring 36 in sealing relationship to the opening 22 in the body 12. At the lower portion of the pop-up rod tube 34 there is provided a grooved sealing ring 40 with an O-ring seal 42 in the groove of the sealing ring 40 in sealing relationship to the open lower end of the shank portion 14. An outwardly projecting annular shoulder 44 at the bottom of the grooved sealing ring 40 seats against the bottom of the body shank portion 14. Desirably, the pop-up rod tube is molded in one piece of a lightweight plastic material such as polycaprolactams, acrylics, polyvinyl chloride or acetal copolymer resins.

The hollow body spout portion 18 has an open end 20 with a groove 21 therein. An O-ring seal 24 is positioned within the groove 21.

The body 12 further has a bottom cover flange 26 which extends from an outer end of the spout portion 18 back to an annular sealing ring 30. A web 28 with an opening 29 is provided between the cover portion 26 and the spout portion 18 for reinforcement purposes. The ring 30 extends around the shank portion 14 and forms bosses 55 (FIG. 3) with screw openings 56 therein.

Figure 3:
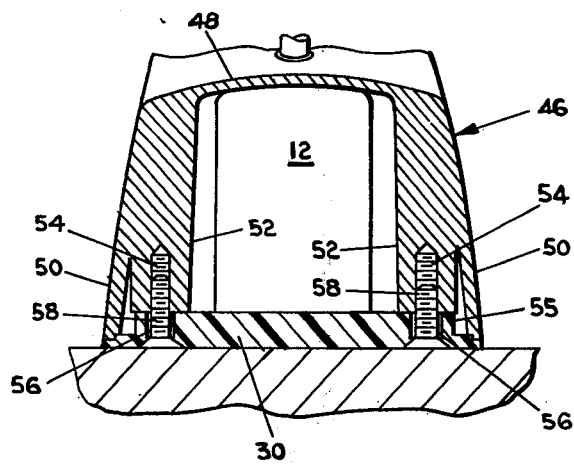
FIG. 3 is a partial sectional view taken along lines 3—3 of FIG. 1.
Figure 4:
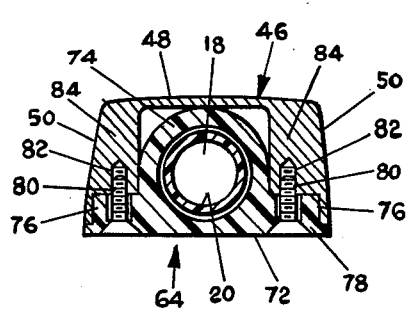
FIG. 4 is a partial sectional view taken along lines 4—4 of FIG. 1.

The cover 46 is generally U-shaped in cross-section having a top portion 48 and depending sidewalls 50. Typically, the cover can be zinc and formed in a die casting operation. The cover desirably is plated for decorative purposes. Bosses 52 (FIG. 3) are formed at a rear portion of the cover and contain threaded openings 54 to receive screws 58. As seen in FIG. 3, the screws 58 pass through the openings 56 in the body ring 30 and threadably engage the threaded openings 54 to secure the cover at a rear portion to the body. As illustrated in FIG. 1, the cover has an opening 60 to permit passage of the pop-up rod 32 therethrough.

The elbow conduit 64 provides a passage 66 for the open end 20 of the body shank portion 18. To this end, an open connector end 70 in the conduit 66 couples to the open end 20 of the spout portion 18. A threaded opening 68 is provided at the outlet side of the elbow conduit for threadably mounting a conventional aerator (not shown) in conventional fashion. A collar 74 (FIG. 4) encircles the open end 20 of the body spout portion 18. The O-ring 24 provides a seal between the body spout portion 18 and the collar 74.

A base flange 72 on the elbow conduit 64 surrounds the threaded opening 68 and provides a bottom cover for the spout assembly at the elbow conduit. Thickened portions 76 of the flange 72 with screw openings 68 abut downwardly extending bosses 84 in cover 46. Threaded openings 82 are provided in the cover bosses 84. Screws 80 extend through the screw openings 68 in the elbow conduit 64 and threadably engage the threaded openings 82 in the cover bosses 84 to secure the elbow conduit 64 to the cover 46.

In its intended environment, the shank portion 14 of the body extends through an opening in a countertop 86 in conventional fashion and is secured thereto through a threaded securing nut 88 which engages the threaded surface 15 of the body shank portion 14. An internally threaded water supply manifold 92 is screwed onto the lower end of the body shank portion 14 and is secured thereto through threaded securing nuts 90 and 93. The securing nut 90 has a shoulder at the bottom portion thereof which abuts the pop-up rod tube shoulder 44 to retain the pop-up rod tube 34 in the position illustrated. A water passage 94 is provided in a connector boss 96 of the supply manifold 92 and is in communication with one of the water passage openings 16 in the body shank portion 14 for supply of hot water, for example, to the interior of the shank portion 14. In like manner, a water passage 98 is provided in a connector boss 100 of the supply manifold 92. The water passage 98 is in communication with the other water passage opening 16 for supply of cold water, for example, to the interior of the shank portion 14. Thus, water supplied to one or both of the water passages 94 and 96 enters the interior of the body shank portion 14 through the openings 16, passes up the annular area of the shank portion, through the hollow spout portion 18 and through the elbow conduit 64.

The invention provides a spout assembly with few parts to facilitate assembly. Further, the one-piece body with the integral spout portion 18, shank portion 14, cover portion 16 and ring 30 is relatively inexpensive to manufacture, durable in construction, and free from corrosion. The one-piece body significantly reduces the number of parts required for the spout assembly to four: the body, the elbow conduit 64, the cover 46, and the pop-up rod tube 34. The assembly is put together in several simple operations: placing the elbow conduit 64 on the spout portion 18; placing the pop-up rod tube 34 within the shank portion 14; placing the cover 46 over the elbow conduit 64, shank portion 18 and ring 30; and placing the screws 80 and 58 in the proper locations to secure the cover to the body 12 and to the elbow conduit 64. The spout assembly can then be shipped to its final destination with the final assembly taking place in a conventional fashion.

Figure 6:
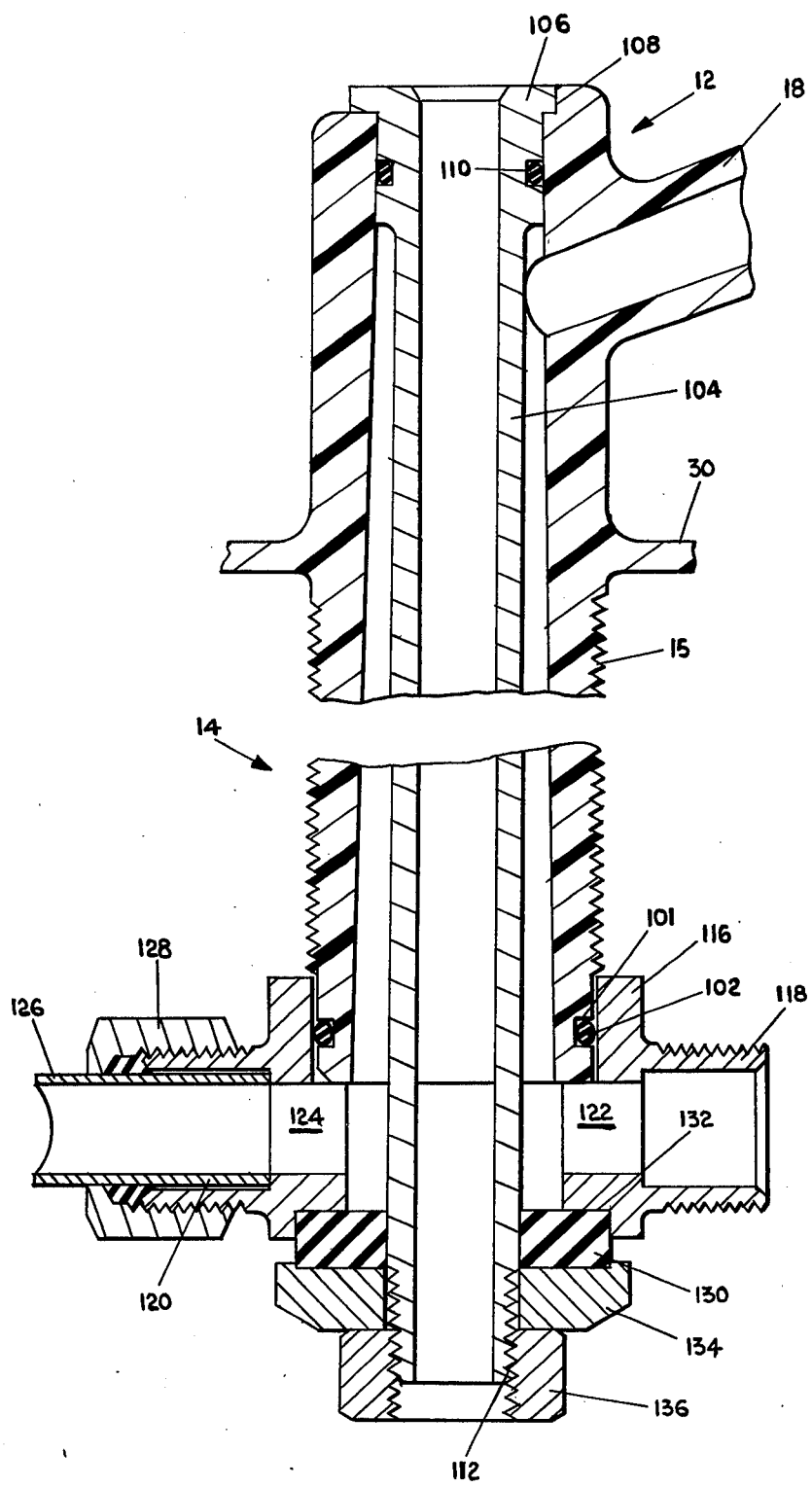
FIG. 6 is a partial elevational view in section of a second embodiment of the invention.

Reference is now made to FIG. 6 for a description of the second embodiment of the invention. In this embodiment, like numerals have been used to designate like parts.

In the second embodiment, the integrally molded one-piece body 12 including the hollow spout portion 18 and the bottom cover flange 26 are identical with the fist embodiment shown in FIGS. 1 through 5. The shank portion 14 of the body 12 is similar in that it is hollow and has an externally threaded outer surface 15. The shank portion 14 has a groove 101 which houses O-ring 102 at the bottom portion thereof. A brass pop-up rod tube 104, made, for example, from screw machine stock, is positioned within the hollow body 12 and shank portion 14 thereof. The brass pop-up rod tube 104 has a ring 106 at the top portion thereof which abuts against a top shoulder 108 of the body 12. An O-ring seal 110 is provided in a groove at the top of the pop-up rod tube 104 to provide a seal at that point between the pop-up rod tube 104 and the body 12. The pop-up rod tube 104 has a threaded outer surface 112 at the bottom thereof.

A conventional manifold 116 having threaded pipe connections 118 and 120 with openings 122 and 124 respectively therethrough is positioned at the bottom of the shank portion 14 of the body 12 in sealing relationship with the O-ring 102. For purposes of illustration, a water supply pipe 126 is shown secured to the threaded connection 120 through a collar 128.

The manifold 116 is retained in position on the bottom of the shank portion 114 by a nut 136 which threadably engages the threaded surface 112 of the pop-up rod tube 104. A rubber bushing 130 sealingly engages a collar 132 on the manifold 116 and a spacer washer 134 is provided between the manifold 116 and the nut 136.

The pop-up rod tube 104 thus bears against the top of the molded body 12 at the upper portion and forces the manifold 116 against the lower portion of the shank portion 14 of the body at a lower portion thereof. Tightening of the nut 136 thus applies compression to the shank portion 14 of the body 12 to enhance the strength thereof for internal bursting pressure.

The embodiment of FIG. 6 works in substantially the same manner as that of FIG. 1. Namely, the hot and cold water flows respectively through the openings 122 and 124 into and through the annular space between the shank portion 14 of the body and the pop-up rod tube 104, and through the interior bore of the spout portion 18.

Although not shown in FIG. 6, the entire spout assembly of the embodiment illustrated in FIG. 6 would be otherwise identical with that shown in FIGS. 1 through 5. Namely, a cover, a pop-up rod tube, and an elbow conduit like that shown in FIGS. 1 through 4 would be provided. Further, the assembly would be secured in practice to a countertop with a securing nut in the same fashion as illustrated in FIG. 1.

Reasonable variation and modification are possible with the scope of the foregoing disclosure and drawings without departing from the spirit of the invention which is defined by the appended claims.

The embodiments of the invention in which an exclusive property or privilege is claimed are defined as follows:

1. A lavatory spout comprising:
   a one-piece integrally molded body having an outwardly extending hollow straight spout portion with an open outer end and a depending hollow shank portion, said spout and shank portions being in open communication so that water can pass up through the shank and spout portions, means in a lower portion of the shank portion to supply water thereto, a bottom cover flange on said spout portion extending outwardly from a bottom portion thereof and along the length thereof;
   a separate elbow conduit secured to the outer open end of the body spout portion and providing an elbow passage at the outer end of the spout portion;
   a cover for the body, the cover having a top and depending sidewalls extending around the spout portion, the elbow conduit and the upper portion of the shank portion, the sidewalls of the cover meeting the side edges of the cover flange to enclose the spout portion; and
   means for securing the cover to the body and to the elbow conduit.

2. A lavatory spout according to claim 1 and further comprising a pop-up rod tube positioned within said body and extending from an upper portion thereof to a lower portion of said shank portion, said pop-up rod tube having an outer diameter less than the inner diameter of said shank portion to define an annular water passage therebetween; means sealing said pop-up rod tube at an upper portion thereof to an upper portion of said body; and means for sealing said water passage at lower portions of said pop-up rod tube and shank portion.

3. A lavatory spout according to claim 2 wherein said pop-up rod tube has an outwardly extending lip at a lower end which abuts a bottom of said body shank portion to precisely position said pop-up rod tube within said body.

4. A lavatory spout according to claim 3 wherein said body further includes a pop-up rod tube opening at an upper portion thereof and the upper portion of the pop-up rod tube is positioned in said opening.

5. A lavatory spout according to claim 2 wherein said pop-up rod tube is made from a lightweight plastic material and is molded in one piece.

6. A lavatory spout according to claim 1 wherein said bottom cover flange includes a ring flange which extends around an upper portion of said shank portion, and said cover meets said ring flange.

7. A lavatory spout according to claim 6 wherein said shank portion has a threaded outer surface below said ring flange for securing said body to a support therefor.

8. A lavatory spout according to claim 6 wherein said securing means for said cover and said body comprises bosses which extend downwardly within a rear portion of said cover, threaded openings in said bosses, and screws extending through said ring flange and threadably engaging said threaded openings in said bosses.

9. A lavatory spout according to claim 1 wherein said shank portion has a threaded outer surface at a lower portion thereof for securing said body to a support and for securing water supply collars thereto.

10. A lavatory spout according to claim 1 and further comprising side flanges on said elbow conduit, which side flanges mate with the sidewalls of the cover to enclose portions of the elbow conduit.

11. A lavatory spout according to claim 10 wherein said means for securing the cover to the elbow conduit comprise bosses extending downwardly within said cover adjacent said elbow conduit and to said side flanges, threaded openings in the bosses and screws extending through the side flanges and threadably engaging the holes in the bosses.

12. A lavatory spout according to claim 1 and further comprising a pop-up rod tube positioned within said body and extending from an upper portion thereof to a lower portion of said shank portion, said pop-up rod tube having an outer diameter less than the inner diameter of said shank portion to define an annular water passage therebetween; means for sealing said water passage at upper and lower portions of said pop-up rod tube and said body and shank portions respectively; and means for compressing said body and shank portions between upper and lower portions of said pop-up rod tube.

* * * * *